United States Patent
Kapil et al.

(10) Patent No.: US 9,971,991 B2
(45) Date of Patent: May 15, 2018

(54) AUTOMATED, NEW SPARE PARTS FORECASTING AND DEMAND PLANNING SYSTEM

(71) Applicant: Accenture Global Services Limited, Dublin (IE)

(72) Inventors: Ashwini Kapil, Navi Mumbai (IN); ZahirAbbas N. Khaswala, Navi Mumbai (IN)

(73) Assignee: Accenture Global Services Limited, Dublin (IE)

( * ) Notice: Subject to any disclaimer, the term of this patent is extended or adjusted under 35 U.S.C. 154(b) by 339 days.

(21) Appl. No.: 14/698,327

(22) Filed: Apr. 28, 2015

(65) Prior Publication Data
US 2016/0321606 A1    Nov. 3, 2016

(51) Int. Cl.
| | | |
|---|---|---|
| *A01K 5/02* | (2006.01) | |
| *G06F 17/50* | (2006.01) | |
| *G06Q 10/08* | (2012.01) | |
| *G06Q 30/06* | (2012.01) | |
| *G06Q 10/00* | (2012.01) | |
| *G06F 19/00* | (2018.01) | |
| *G06F 17/30* | (2006.01) | |
| *G06F 11/34* | (2006.01) | |

(52) U.S. Cl.
CPC ..... *G06Q 10/0875* (2013.01); *G06Q 30/0633* (2013.01); *G06F 11/34* (2013.01); *G06F 17/30* (2013.01); *G06F 19/00* (2013.01); *G06Q 10/00* (2013.01)

(58) Field of Classification Search
CPC .......... G06Q 10/00; G06Q 10/08; G06F 9/54; G06F 11/34; G06F 17/30; G06F 19/00; G06F 11/00
USPC ............. 705/7.11, 7.31, 28; 700/97, 99, 107
See application file for complete search history.

(56) References Cited

U.S. PATENT DOCUMENTS

| | | | | |
|---|---|---|---|---|
| 6,684,349 | B2 * | 1/2004 | Gullo | G06F 11/008 701/32.1 |
| 7,266,518 | B2 * | 9/2007 | Klim | G06Q 10/06 700/107 |
| 8,224,717 | B2 * | 7/2012 | Giacobbe | G06Q 10/06315 705/28 |
| 2007/0124009 | A1 * | 5/2007 | Bradley | G06Q 10/06 700/99 |
| 2007/0225844 | A1 * | 9/2007 | Cihla | G06Q 10/087 700/97 |
| 2007/0244589 | A1 * | 10/2007 | Oku | G06Q 10/04 700/97 |

(Continued)

Primary Examiner — Olusegun Goyea
(74) Attorney, Agent, or Firm — Harrity & Harrity, LLP

(57) ABSTRACT

A system may receive an identifier for a new model product and identify a stored parts list associated with the identifier. The system may determine a code for one or more parts included on the parts list and may compare the code for a part, of the one or more parts included on the parts list, with codes for parts included in old model products. The system may determine that the part included on the parts list is comparable to one of the parts included in the old model products if the code for the part included on the parts list matches the code for the one of the parts included in the old model products. The system may use data associated with the one of the parts included in the old model products to generate a new spare parts forecast.

20 Claims, 12 Drawing Sheets

(56) References Cited

U.S. PATENT DOCUMENTS

| | | | |
|---|---|---|---|
| 2011/0191139 A1* | 8/2011 | Hong | G06Q 10/087 705/7.31 |
| 2012/0290342 A1* | 11/2012 | Gower | G06Q 10/087 705/7.11 |
| 2014/0067628 A1* | 3/2014 | Homan | G06Q 10/0875 705/29 |
| 2014/0229448 A1* | 8/2014 | Chida | H02K 15/02 707/688 |
| 2015/0095921 A1* | 4/2015 | Weiderman Sandahl | G06F 9/542 719/318 |

* cited by examiner

AUTOMATED, NEW SPARE PARTS FORECASTING AND DEMAND PLANNING SYSTEM

BACKGROUND

To prevent operational delay when products fails, supply chain managers require an inventory of available service (or spare) parts for the products to enable repairs and/or restore operations.

SUMMARY

In some possible implementations, a system may receive an identifier for a new model product. The system may identify a stored parts list associated with the identifier for the new model product. The system may determine a code for one or more parts included on the parts list for the new model product. The system may compare the code for a part, of the one or more parts included on the parts list for the new model product, with codes for parts included in old model products. The system may determine that the part included on the parts list for the new model product is comparable to one of the parts included in the old model products if the code for the part included on the parts list for the new model product matches the code for the one of the parts included in the old model products. The system may use data associated with the one of the parts included in the old model products to generate a new spare parts forecast for a type and a quantity of new spare parts associated with the part included on the parts list for the new model product.

In some possible implementations, a computer-readable medium may store instructions that, when executed by one or more processors, cause the one or more processors to receive an identifier for a new model product. The instructions, when executed by one or more processors, may further cause the one or more processors to identify a stored parts list associated with the identifier for the new model product. The instructions, when executed by one or more processors, may further cause the one or more processors to determine a code for one or more parts included on the parts list for the new model product. The instructions, when executed by one or more processors, may further cause the one or more processors to compare the code for a part, of the one or more parts included on the parts list for the new model product, with codes for parts included in old model products. The instructions, when executed by one or more processors, may further cause the one or more processors to determine that the part included on the parts list for the new model product is comparable to one of the parts included in the old model products if the code for the part included on the parts list for the new model product matches the code for the one of the parts included in the old model products. The instructions, when executed by one or more processors, may further cause the one or more processors to use data associated with the one of the parts included in the old model products to generate a new spare parts forecast for new spare parts associated with the part included on the parts list for the new model product. The instructions, when executed by one or more processors, may further cause the one or more processors to output the new spare parts forecast.

In some implementations, a method may include receiving, by a device, an identifier for a new model product. The method may include receiving, by the device, a date range for a new spare parts forecast associated with the new model product. The method may include identifying, by the device, a stored parts list associated with the identifier for the new model product. The method may include determining, by the device, a code for a part included on the parts list for the new model product. The method may include comparing, by the device, the code for the part included on the parts list for the new model product with codes for parts included in old model products. The method may include determining, by the device, that the part included on the parts list for the new model product is comparable to one of the parts included in the old model products if the code for the part included on the parts list for the new model product matches the code for the one of the parts included in the old model products. The method may include using, by the device, data associated with the one of the parts included in the old model products to generate, for the date range, the new spare parts forecast for new spare parts associated with the part included on the parts list for the new model product. The method may include outputting, by the device, the new spare parts forecast.

DETAILED DESCRIPTION

Figure 1:
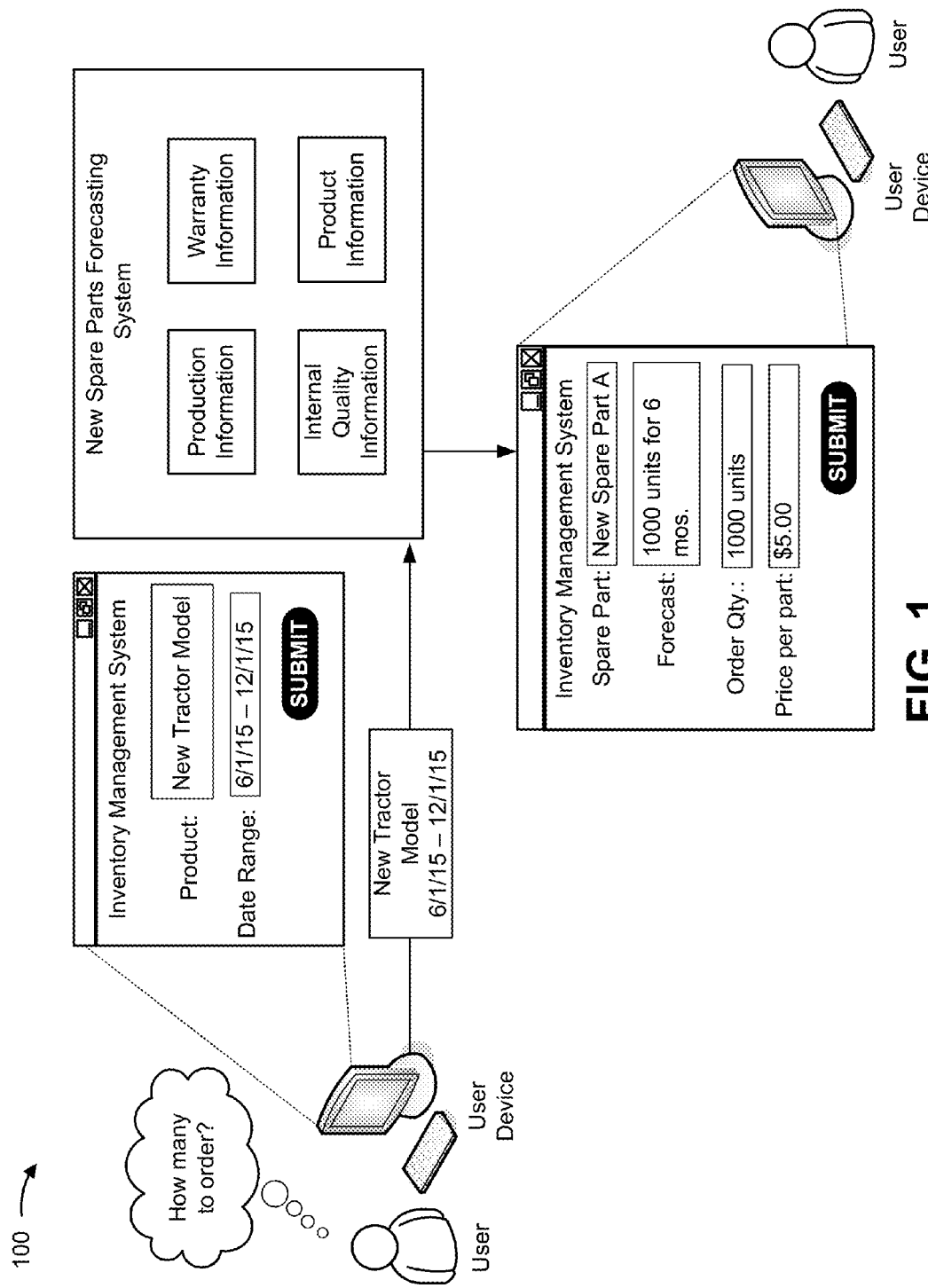
FIG. 1 is a diagram of an overview of an example implementation described herein.

The following detailed description of example implementations refers to the accompanying drawings. The same reference numbers in different drawings may identify the same or similar elements.

During a normal life cycle of products with multiple parts (e.g., appliances, automotive equipment, heavy industrial equipment, etc.), one or more parts may fail for various reasons (e.g., normal use, a material defect, an accident, etc.). Spare parts are necessary to prevent operational delays when a part fails. Carrying a significant amount of safety stock of spare parts in inventory may pose a solution. However, without knowledge of which part may likely fail and an intermittent demand created for an associated spare part, carrying a large quantity of spare parts for each and every unique part may be costly. Additionally, subsequent modifications to the products may render certain parts and the associated spare parts for the certain parts obsolete, driving costs up as the spare parts may require replacing.

Forecasting methodologies (e.g., a Croston's intermittent demand model, a Monte Carlo simulation, a regression model with seasonal causal for intermittent data, etc.) and/or tools may be utilized to determine parts that may likely fail and may factor in the intermittent demand created for associated spare parts as a result of the failure. Forecasting methodologies and/or tools allow a supply chain manager to determine a type and a quantity of spare parts to store in inventory during a set period of time. Generally, forecasting methodologies and/or tools utilize historical data for a product to provide a forecast of one or more parts, included in the product, that may likely fail and predict a failure rate for the one or more parts. Based on the forecasts utilizing historical data, a supply chain manager may maintain an accurate and cost efficient inventory of available spare parts.

A new product, however, does not have historical data for failed parts, to provide as an input to a forecasting methodology and/or tool. Without historical failure rate data, predicting an accurate and cost efficient inventory of available spare parts may prove difficult. Operational delays may occur for the product if a supply chain manager keeps too few a quantity of the spare parts in inventory, impacting customer satisfaction and/or customer attitude towards the new product. Conversely, the costs may be high if the supply chain manager keeps too great a quantity of the spare parts in inventory (e.g., costs associated with purchasing unused spare parts, costs associated with storing unused spare parts, costs associated with replacing obsolete spare parts, costs associated with depreciation of unused spare parts, etc.). Additionally, warranty costs are also negatively impacted as the supply chain manager takes additional steps to secure spare parts for the new product.

Implementations described herein provide an automated, new spare parts forecasting and demand planning system (referred to hereinafter as a new spare parts forecasting system) that accurately predicts a type and a quantity of one or more new spare parts that may be stored in inventory for a new product, to minimize costs and operational delays for the product incorporating the new spare parts, thereby improving overall customer satisfaction, by integrating and utilizing various sources of information (e.g., production information, warranty information, internal quality information, product information, etc.).

FIG. 1 is a diagram of an overview of an example implementation 100 described herein. As shown in FIG. 1, assume a user (e.g., a supply chain manager) of a user device wants to order spare parts for associated parts included in a new product (e.g., a new model of a tractor) in an accurate and cost efficient manner, in anticipation of failures associated with the parts that may occur during a set period of time (e.g., 6 months after a product launch for the new product). Assume, however, the user does not know a type and a quantity of the spare parts to order to store in inventory, without having any historical data for which parts may likely fail and a failure rate for the part.

As shown in FIG. 1, example implementation 100 may include a user device, such as a personal computer, and a new spare parts forecasting system. The user of the user device may enter in a name for the new product (e.g., New Tractor Model). The user may also enter a date range (e.g., Jun. 1, 2015-Dec. 1, 2015) for potential failure of parts included in the new product.

As shown in FIG. 1, the new spare parts forecasting system may receive the name for the new product and the date range as input. The new spare parts forecasting system may perform an analysis of the new product to forecast a type and a quantity of one or more new spare parts to order. As shown in FIG. 1, the new spare parts forecasting system may include stored information, such as production information, warranty information, internal quality information, and/or product information.

As shown in FIG. 1, the new spare parts forecasting system may use the stored information to analyze the new product and provide a forecast of the type of new spare part (e.g., New Spare Part A) and the quantity of the new spare part to order (e.g., 1000 units of New Spare Part A) to minimize costs and reduce operational delays for the new product. For example, the new spare parts forecasting system may consider various factors (e.g., comparable parts based on functionality, a failure rate for comparable parts, sales forecast for the new product, internal factory failure rate and/or audit data, etc.).

As shown in FIG. 1, the user may order the new spare part based on the quantity suggested by the new spare parts forecasting system or another specified quantity. By using historical data for comparable parts and/or parts with similar functionality, real-time factory data for a failed part included in a new product, improvement data for parts included in a new product over comparable parts, and/or other information, the new spare parts forecasting system may increase accuracy of a new spare parts forecast, including the type and the quantity of new spare parts that need to be stored in inventory, thereby minimizing costs and reducing operational delays as a result of parts failure.

Figure 2:
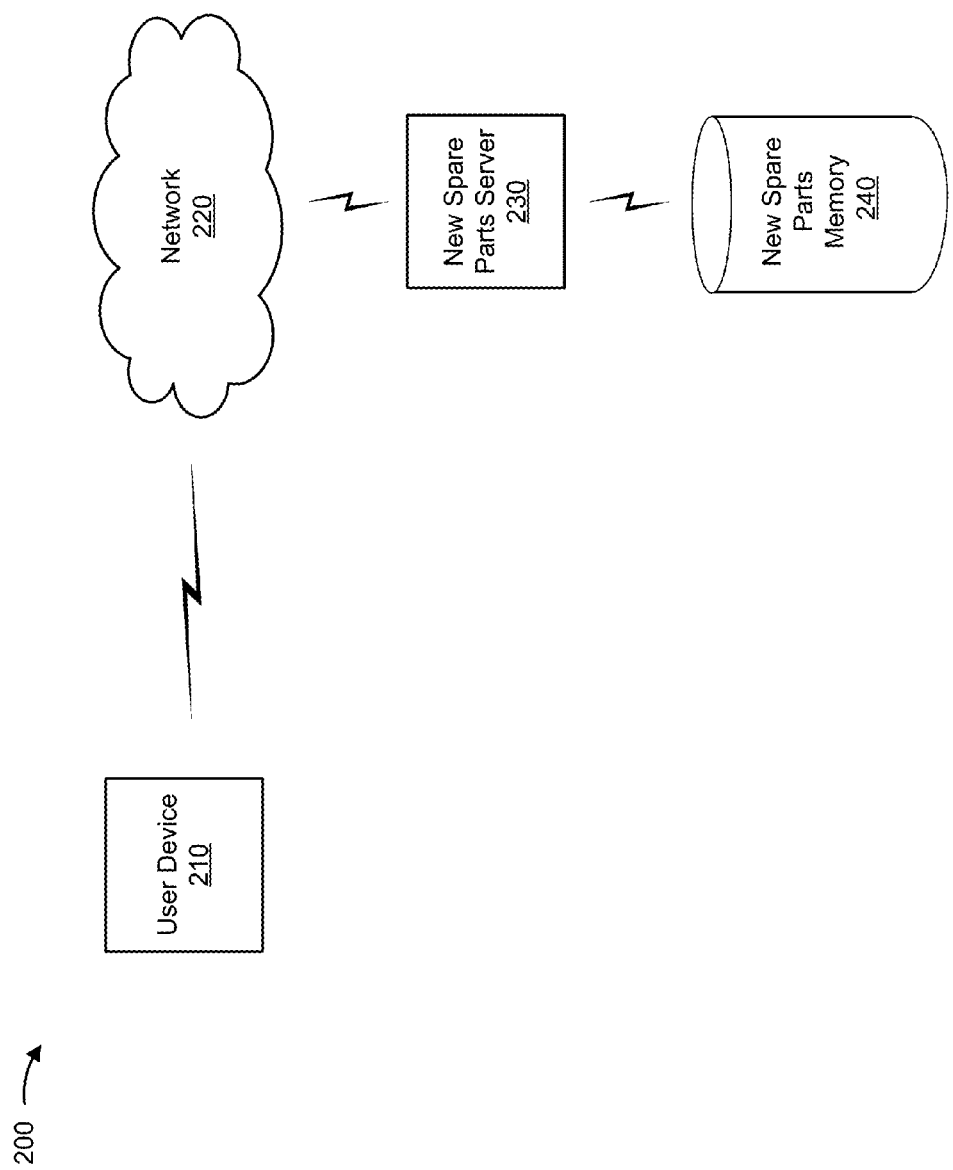
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a network 220, a new spare parts server 230, and a new spare parts memory 240. Devices of environment 200 may interconnect via wired connections, wireless connections, or a combination of wired and wireless connections.

User device 210 may include a device capable of providing, presenting, and/or displaying information. For example, user device 210 may include a mobile phone (e.g., a smart phone, a radiotelephone, etc.), a computing device (e.g., a desktop computer, a laptop computer, a tablet computer, a handheld computer, etc.), and/or a device of a similar type. In some implementations, user device 210 may receive information from and/or transmit information to new spare parts server 230 and/or another device.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

New spare parts server 230 may include one or more server devices capable of generating, processing, and/or providing information. In some implementations, new spare parts server 230 may generate, process, store, and/or provide forecasting information to user device 210 and/or another device. In some implementations, new spare parts server 230 may receive information from and/or transmit information to user device 210, new spare parts memory 240, and/or another device.

New spare parts memory 240 may include one or more memory devices capable of processing, storing, and/or providing information. In some implementations, new spare parts memory 240 may process, store, and/or provide information, such as production information, warranty information, internal quality information, products information, and/or other information.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
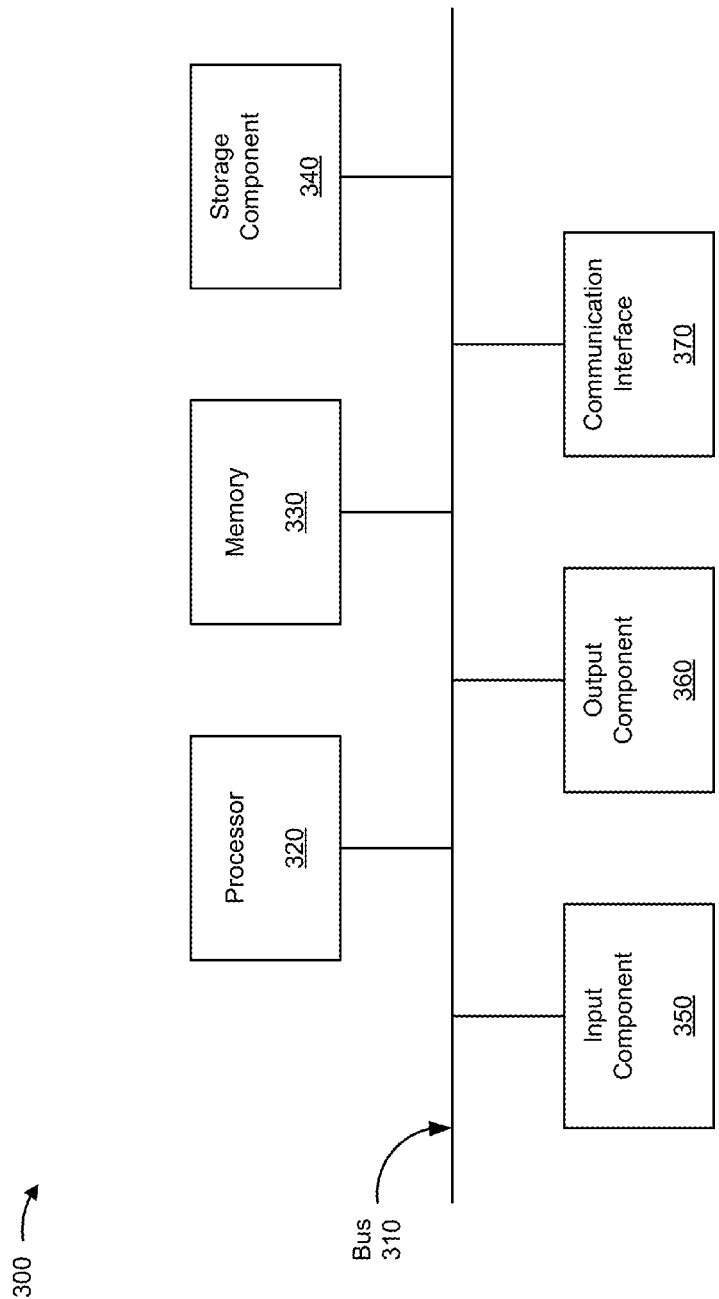
FIG. 3 is a diagram of example components of one or more devices of FIG. 2.

FIG. 3 is a diagram of example components of a device 300. Device 300 may correspond to user device 210 and/or new spare parts server 230 of FIG. 2. In some implementations, user device 210 and/or new spare parts server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
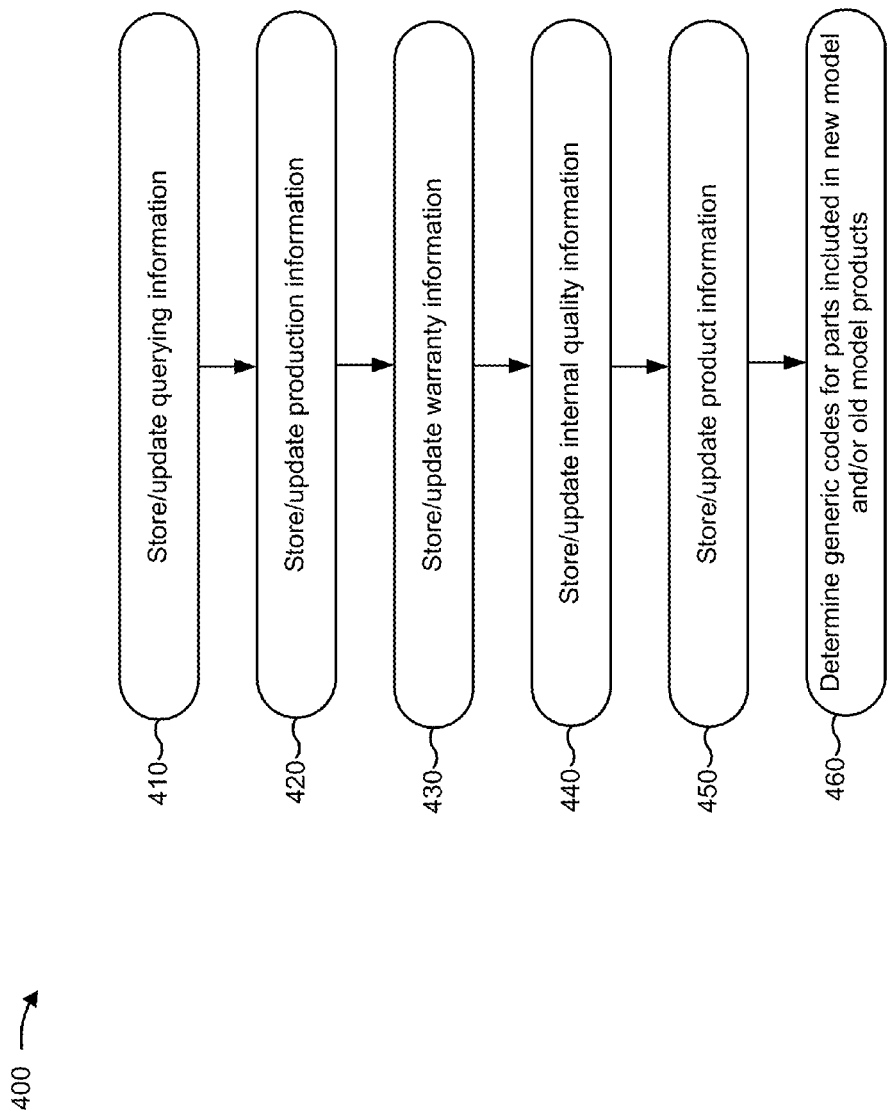
FIG. 4 is a flow chart of an example process for setting up an automated, new spares parts forecasting and demand planning system.

FIG. 4 is a flow chart of an example process 400 for setting up a new spare parts forecasting system. In some implementations, one or more process blocks of FIG. 4 may be performed by new spare parts server 230. In some implementations, one or more process blocks of FIG. 4 may be performed by another device or a set of devices separate from or including new spare parts server 230, such as one or more user devices 210 and/or another device.

As further shown in FIG. 4, process 400 may include storing and/or updating querying information (block 410). For example, new spare parts server 230 may receive querying information, from user device 210 and/or another device, including a standard dictionary of parts and/or terms. Additionally, or alternatively, querying information may include configured text analytics. Text analytics refers to a process of deriving high-quality information from text, derived through devising patterns and/or trends through various means (e.g., statistical pattern learning, Pareto analysis, trend history analysis, etc.).

Configured text analytics may include receiving various information (e.g., production information, warranty information, internal quality information, product information, etc.), parsing the various information to organize the various information into known structures, adding and/or removing derived linguistic features to the structured information, deriving patterns within the structured information using various techniques (e.g., text categorization, text clustering, production of granular taxonomies, etc.), evaluating and/or interpreting the structured information, or the like.

Additionally, or alternatively, new spare parts server 230 may store the querying information in new spare parts memory 240. In some implementations, new spare parts server 230 may store the querying information in another memory device or a collection of memory devices accessible by new spare parts server 230. Additionally, or alternatively, new spare parts server 230 may update the querying information in new spare parts memory 240 as new/updated information (e.g., new and/or updated production information, new and/or updated warranty information, new and/or updated internal quality information, new and/or updated product information, etc.) is received by new spare parts server 230 and stored and/or updated. In some implementations, new spare parts server 230 may update the querying information in another memory device or a collection of memory devices accessible by new spare parts server 230.

As shown in FIG. 4, process 400 may include storing and/or updating production information (block 420). For example, new spare parts server 230 may receive production information from a factory server (not shown), user device 210, and/or another device. The production information may include information about new model and/or old model products, including parts lists, functionality of parts included on the parts lists, materials information, manufacturing information, or the like. Additionally, or alternatively, production information may include an identifier associated with the new model and/or old model products.

In some implementations, the production information may include product hierarchy information. Product hierarchy information may include a product hierarchy, which may be used to group items by combining various characteristics of the items for evaluation and pricing purposes. Product hierarchy may be defined using a string where each product hierarchy level, defined by a string segment, represents a different characteristic of a product and/or a part (e.g., Level 1=00001 may represent tractor parts, Level 2=00002 may represent engine parts, Level 3=00000003 may represent engine gasket parts, etc.). The string segments may be combined to identify the product hierarchy for the product and/or the part based on functionality (e.g., the product hierarchy for a crankshaft seal may be 000010000200000003).

In some implementations, new spare parts server 230 may determine the production information automatically, using stored querying information, from technical specifications, from bills of materials, and/or from other associated documentation for the new model and/or the old model products. In some implementations, the production information may be input by a user of the factory server, user device 210, and/or another device.

Additionally, or alternatively, new spare parts server 230 may store the production information in new spare parts memory 240. In some implementations, new spare parts server 230 may store the production information in another memory device or a collection of memory devices accessible by new spare parts server 230. Additionally, or alternatively, new spare parts server 230 may update the production information in new spare parts memory 240 as new production information becomes available based on modified parts lists and/or for other reasons for the new model and/or the old model products. In some implementations, new spare parts server 230 may update the production information in another memory device or a collection of memory devices accessible by new spare parts server 230.

As further shown in FIG. 4, process 400 may include storing and/or updating warranty information (block 430). For example, new spare parts server 230 may receive warranty information from the factory server, user device 210, and/or another device. Warranty information may include, for example, a type/scope for a warranty offered for the new model and/or old model products (e.g., a lifetime warranty, a satisfaction guarantee warranty, a defect in materials and workmanship warranty, etc.). Additionally, or alternatively, warranty information may include a period of time the warranty is effective (e.g., one year from a date of retail purchase, two years from a date of retail purchase, a lifetime warranty, etc.). Additionally, or alternatively, warranty information may include other terms-related information (e.g., a name of an associated factory and/or manufacturer providing the warranty, a region for coverage, special terms associated with a country where a purchase was made, etc.).

Additionally, or alternatively, warranty information may include claim information. Claim information may be information associated with claims, made under the warranty, for one or more parts for the new model and/or old model products. Initially, the new model products may not have any claim information. However, the new model products may obtain claim information as the new model products enter into circulation after a product launch.

Claim information may include information about parts, included in the new model and/or the old model products, against which claims are made (e.g., part categories/numbers, manufacturing information such as build dates, products/models into which the parts are incorporated, cost of the parts, machine age, usage hours, pre-delivery inspection (PDI) information, etc.). Additionally, or alternatively, claim information may include reasons for the claims (e.g., part failure, failure to meet customer expectation, under-performance of a part, etc.). Additionally, or alternatively, claim information may include additional information related to the claims (e.g., downtime associated with the claims, low hour claims, requested action to resolve the claim, etc.).

In some implementations, new spare parts server 230 may determine the warranty information automatically, using stored querying information. In some implementations, the warranty information may be input by a user of the factory server, user device 210, and/or another device.

Additionally, or alternatively, new spare parts server 230 may store the warranty information in new spare parts memory 240. In some implementations, new spare parts server 230 may store the warranty information in another memory device or a collection of memory devices accessible by new spare parts server 230. Additionally, or alternatively, new spare parts server 230 may update the warranty information in new spare parts memory 240 as new warranty information becomes available based on new claims made against one or more parts for the new model and/or the old model products. In some implementations, new spare parts server 230 may update the warranty information in another memory device or a collection of memory devices accessible by new spare parts server 230.

As further shown in FIG. 4, process 400 may include storing internal quality information (block 440). For example, new spare parts server 230 may receive internal quality information from the factory device, user device 210, and/or another device. Internal quality information may include internal failure rate information and improvement information. Internal failure rate information includes engineering and evaluation test (EET) data, internal factory first pass yield (FPY), audit data, and/or pre-delivery inspection (PDI) data for the parts associated with the new model products.

FPY, also known as throughput yield (TPY), is a quantity of a new model product or part coming out of a process divided by a quantity of the new model product or part going into the process, over a specified period of time. New model products or parts, requiring no rework or scrap, are counted as coming out of the process.

Internal failure rate information may include an internal failure rate for the parts associated with the new model products. Additionally, or alternatively, internal quality information may include defect information for the new model products or parts.

Improvement information may include non-compliance and corrective action (NCCA) data and/or corrective action report(s) (CARs) for the new model products and/or parts. NCCA data may indicate a problem discovered with a new model product and/or part before a final inspection for which a corrective action may have taken place. Corrective action may be memorialized in a CAR. Additionally, or alternatively, NCCA data and CARs may include improvements made to the new model products and/or parts over the old model products and/or parts.

In some implementations, new spare parts server 230 may determine the internal quality information automatically, using the stored querying information, from EET data, FPY data, NCCA data, CARs, and/or other information. For example, new spare parts server 230 may read the EET data, the FPY data, the NCCA data, the CARs, and/or other information, provided in a general purpose short-notes application (e.g., QNotes, MS OneNote, a text editor) and/or another application, to identify and/or extract internal quality information. Additionally, or alternatively, new spare parts server 230 may search for parts, listed on the parts list for new model and/or old model parts, and/or use mapping tools to determine which parts are present in the EET data, the FPY data, the NCCA data, the CARS, and/or other data. In some implementations, the internal quality information may be input by the user of the factory server, user device 210, and/or another device.

Additionally, or alternatively, new spare parts server 230 may store the internal quality information in new spare parts memory 240. In some implementations, new spare parts server 230 may store the internal quality information in another memory device or a collection of memory devices accessible by new spare parts server 230.

As further shown in FIG. 4, process 400 may include storing and/or updating product information (block 450). For example, new spare parts server 230 may receive product information from a sales device (not shown), user device 210, and/or another device. Product information may include sales forecast data for the new model products. Additionally, or alternatively, product information may include a quantity of the new model products manufactured. Additionally, or alternatively, product information may include a sales plan for the new model products. Additionally, or alternatively, product information may include sales data for the new model and/or old model products.

In some implementations, new spare parts server 230 may determine the product information automatically, using the stored querying information, from a variety of sales-related documentation (e.g., sales inquiry documents, sales quotation documents, sales order forms, forecasting documentation, sales plan documentation, etc.). In some implementations, the product information may be input by a user of the sales device, user device 210, and/or another device.

Additionally, or alternatively, new spare parts server 230 may store the product information in new spare parts memory 240. In some implementations, new spare parts server 230 may store the product information in another memory device or a collection of memory devices accessible by new spare parts server 230. Additionally, or alternatively, new spare parts server 230 may update the product information in new spare parts memory 240 as new product information becomes available based on revised forecasts and/or sales data for the new and/or old model products. In some implementations, new spare parts server 230 may update the product information in another memory device or a collection of memory devices accessible by new spare parts server 230.

As further shown in FIG. 4, process 400 may include determining generic codes for parts included in new model and/or old model products (block 460). For example, new spare parts server 230 may read the production information, including the parts list for the new and/or old model products to identify specific parts by using the querying information. New spare parts server 230 may group together parts with a same name or part description with a category code (e.g., category code=adhesive, category code=angle, category code=arm, etc.).

Additionally, or alternatively, new spare parts server 230 may group together parts with the same category code and assign a part term code to the parts with the same category code (e.g., one or more adhesives included in a new and/or old model may be assigned a part term code=023001, one or more angles included in a new and/or old model may be assigned a part term code=023002, one or more arms included in a new and/or old model may be assigned a part term code=023002, etc.).

Additionally, or alternatively, new spare parts server 230 may further assign parts with the same part term code with a function code. For example, in a complex, multi-component/multi-system product, parts with the same part term code may be used more than once and for different functions (e.g., in a tractor, an arm may be used in a blower/gear drive system, in a lift system, in a pickup auger system, etc.). Parts with the same part term code may receive a function code, based on a functionality performed by the part (e.g., an arm as a component in a blower/gear drive system may receive a function code=A-E0-4310, an arm as a component in a lift system may receive a function code=A-E0-4775, an arm as a component in a pickup auger system may receive a function code=A-E0-4119, etc.). In some implementations, new spare parts server 230 may determine functionality based on factoring an assigned product hierarchy for the parts.

Additionally, or alternatively, new spare parts server 230 may determine a generic code for parts with matching part term codes, function codes, and/or category codes. As a result, parts included in one or more different model products (i.e., new model and/or an old model products) may receive the same generic code (e.g., an adhesive used as a component in models 0568X and 0569X may receive a generic code=41110048, an angle used as a component in models 0468X and 0569X may receive a generic code=41110153, an arm used as a component in models 0569X, 0558X, 0458S, and 0468X may receive a generic code 41110230, etc.). Parts, receiving the same generic code, over one or more models may be compared (e.g., the adhesive from models 0568X and 0569X with the generic code=41110048 may be compared, the angle from models 0468X and 0569X with the generic code=41110153 may be compared, the arm from models 0569X, 0558X, 0458S, and 0468X with the generic code=41110230 may be compared, etc.).

Additionally, or alternatively, new spare parts server 230 may store the generic code associated with a part in new spare parts memory 240. In some implementations, new spare parts server 230 may store the generic code associated with the part in another memory device or a collection of memory devices accessible by new spare parts server 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
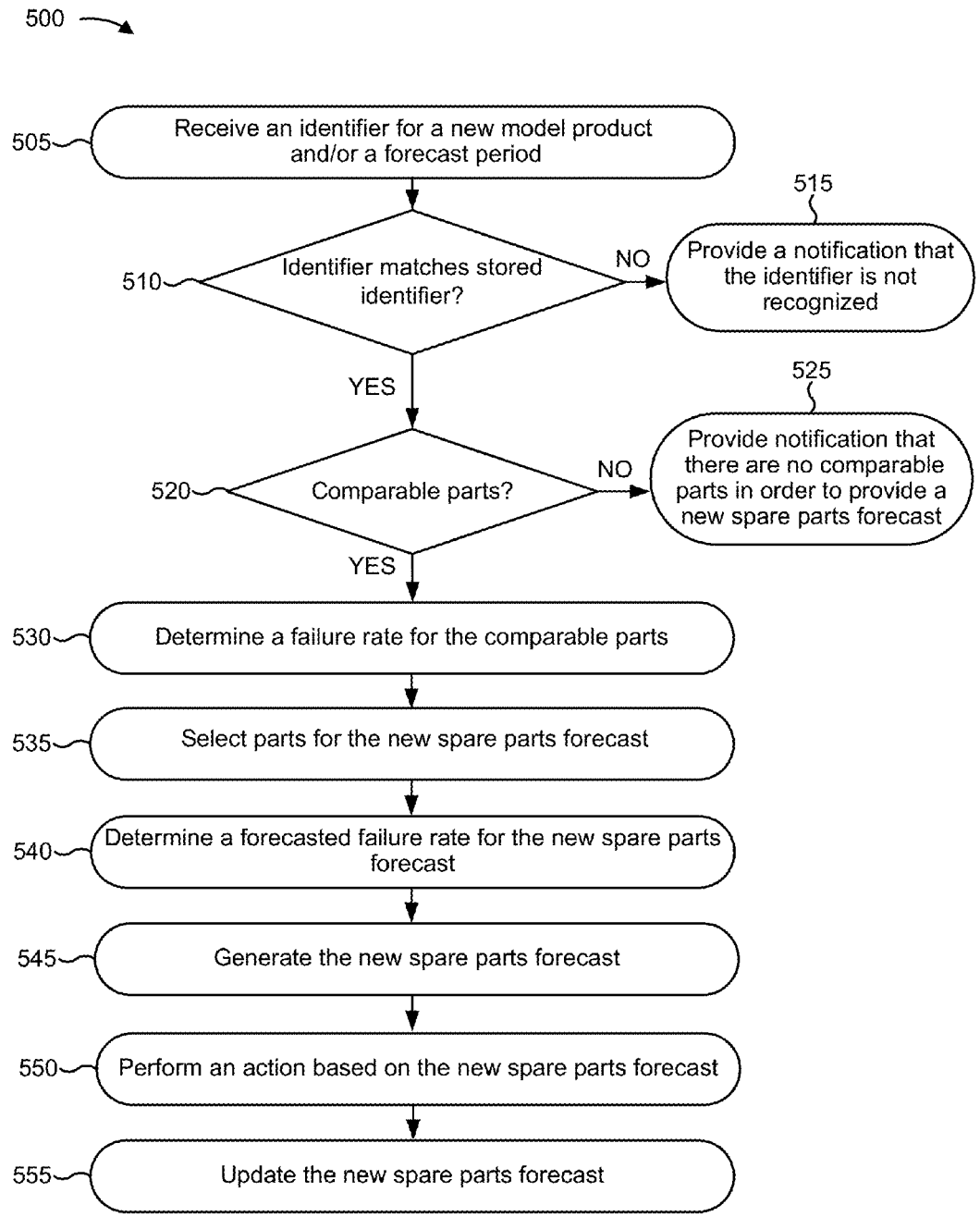
FIG. 5 is flow chart of an example process for using an automated, new spares parts forecasting and demand planning system.

FIG. 5 illustrates a flow chart of an example process 500 for using a new spare parts forecasting system. In some implementations, one or more process blocks of FIG. 5 may be performed by new spare parts server 230. Additionally, or alternatively, one or more process blocks of FIG. 5 may be performed by another device or a group of devices separate from or including new spare parts server 230, such as user device 210 and/or another device.

As shown in FIG. 5, process 500 may include receiving an identifier for a new model product and/or a forecast period (block 505). For example, new spare parts server 230 may receive an identifier for a new model product (e.g., New Tractor Model 500X, New Washing Machine Model 3000, New Laptop Model 50S, etc.) as input by a user of user device 210. Additionally, or alternatively, new spare parts server 230 may receive a forecast period (e.g., 6 months starting from a launch date for the new model product, 9 months starting from a launch date for the new model product, 12 months starting from a launch date for the new model product, etc.).

In some implementations, new spare parts server 230 may receive the identifier for the new model product and/or the forecast period automatically, based on factory and/or product information received from a factory server (not shown), a sales server (not shown), and/or another device. For example, new spare parts server 230 may receive and parse a sales planning document to determine an identifier for the new model product and/or the forecast period. Receiving and parsing a sales planning document is one way of determining the identifier for the new model product, and/or the forecast period and other ways may be possible.

As further shown in FIG. 5, process 500 may include determining whether the identifier matches a stored identifier (block 510). For example, new spare parts server 230 may compare the identifier (e.g., received as an input from user device 210) for the new model product with stored identifiers associated with new model and/or old model products. If the received identifier matches a stored identifier, then new spare parts server 230 may associate a parts list, associated with the stored identifier, with the received identifier for the new model product. If the received identifier does not match the stored identifiers, then new spare parts server 230 may not identify a parts list associated with the received identifier.

As further shown in FIG. 5, if the identifier does not match a stored identifier (block 510—No), then process 500 may include providing a notification that the identifier is not recognized (block 515). For example, if new spare parts server 230 determines that the identifier does not match a stored identifier, then new spare parts server 230 may notify user device 210 that the identifier is not recognized. User device 210 may provide the notification for display so that the user may understand why a new spare parts forecast is not provided. In some implementations, the notification may prompt the user to perform an action based on the notification (e.g., enter a new and/or corrected identifier for the new model product, a new model product from a list of new model products for which to run a new spare parts forecast, terminate a session, etc.).

As further shown in FIG. 5, if the identifier does match the stored identifier (block 510—Yes), then process 500 may include determining whether parts included in the new model product are comparable to parts included in old model products (block 520). For example, new spare parts server 230 may analyze the parts list, for the new model product, to identify the generic codes associated with the parts. New spare parts server 230 may compare the generic codes, associated with the parts included in the new model product, with generic codes associated with parts included in the old model products. If the generic codes, associated with the parts included in the new model product, match the generic codes, associated with the parts included in the old model products, then new spare parts server 230 may determine that the parts included in the new model products and the parts included in the old model products are comparable. If the generic codes for the parts included in the new model product do not match the generic codes for the parts included in the old model product, then new spare parts server 230 may determine that the there are no comparable parts for the parts included in the new model product.

As further shown in FIG. 5, when there are no comparable parts to the parts included in the new model product (block 520—No), process 500 may include providing a notification that there are no comparable parts in order to provide a new spare parts forecast (block 525). For example, new spare parts forecast server 230 may notify the user of user device 210 (e.g., via an email address, via a notification an application program interface (API) provided to user device 210, via another device communicating with user device 210, etc.) that the parts included in the new model product are not comparable to the parts included in the old model products.

In some implementations, new spare parts server 230 may provide information to user device 210 indicating other similar parts to the parts included in the new model product. For example, the parts, included in the new model product, may have an associated parts term code, an associated function code, and/or an associated category code, that matches a parts term code, a function code, and/or a category code of the parts included in the old model product. Additionally, or alternatively, new spare parts server 230 may permit the user of user device 210 to select the other similar parts as a basis for forecasting new spare parts for the new model product. In some implementations, new spare parts server 230 may automatically select the parts, included in the old model product, where the parts term code, the function code, and/or the category code match the parts term code, the function code, and/or the category code of the parts, included in the new model product, as a basis for the new spare parts forecast.

As further shown in FIG. 5, when the parts included in the new model product are comparable to the parts included in the old model products (block 520—Yes), process 500 may include determining a failure rate for the comparable parts (block 530). For example, new spare parts server 230 may determine a failure rate for the comparable parts, using data for the comparable parts to extrapolate a failure rate for parts included in the new model product.

To determine the failure rate, new spare parts server 230 may identify a total quantity of the comparable parts produced. For example, new spare parts server 230 may analyze a variety of information (e.g., production information, product information, etc.), using stored querying information, to determine the total quantity of the comparable parts produced during a set period of time (e.g., a total quantity of 400 adhesives with the generic code=41110048 were produced during 2014, a total quantity of 400 angles with the generic code=41110153 were produced during 2014, a total quantity of 400 arms with the generic code=41110230 were produced during 2014, etc.).

Additionally, or alternatively, new parts server 230 may analyze warranty information, including claim information and/or other information using the stored querying information, to determine the quantity of the comparable parts that failed during the set period of time (e.g. a quantity of 40 adhesives with the generic code=41110048 failed during 2014, a quantity of 10 angles with the generic code=41110153 failed during 2014, a quantity of 10 arms with the generic code=41110230 failed during 2014, etc.).

For example, new spare parts server 230 may determine the quantity of failed parts by analyzing warranty information, including claim information for the comparable parts, using the stored querying information. New spare parts server 230 may query the warranty information to search for failures associated with the comparable parts (e.g., claims/failures associated with the adhesives with the generic code=41110048, claims/failures associated with the angles with the generic code=41110153, claims/failures associated with the angles with the generic code=41110230, etc.) and determine a total quantity of the failures found.

Additionally, or alternatively, new spare parts server 230 may determine the failure rate by dividing the quantity of the comparable parts failed by the total quantity of the comparable parts produced/sold during the set period of time (e.g., the failure rate for the adhesives with the generic code=41110048, during 2014, is 10% (40 failed adhesives divided by 400 adhesives produced/sold); the failure rate for the angles with the generic code=41110153, during 2014, is 2.5% (10 failed adhesives divided by 400 angles produced/sold); the failure rate for the arms with the generic code=41110230, during 2014, is 25% (10 failed arms divided by 400 arms produced/sold); etc.). The failure rate may be calculated on various levels (e.g., on a part level, on a system level, on a model/product level, etc.).

As further shown in FIG. 5, process 500 may include selecting parts for the new spare parts forecast (block 535). For example, new spare parts server 230 may select the parts, included in the new model product, for the new spare parts forecast based on the failure rate for the comparable parts (e.g., select the parts, included in the new model product, where the comparable parts received the 10 highest failure rates; select the parts, included in the new model product, where the comparable parts received the 20 highest failure rates; select the parts, included in the new model product, where the comparable parts received the 25 highest failure rates; select all the parts; etc.). For example, new spare parts server 230 may select, for the new spare parts forecast, the part with the highest failure rate for the comparable parts (e.g., adhesives selected for new spare parts forecast with a failure rate of 10%, where the failure rate for the adhesives is higher than the failure rates for other parts).

In some implementations, the parts for the new spare parts forecast may be selected automatically based on other factors (e.g., selecting parts based on customer dissatisfaction, selecting parts based on a quantity of parts failed; selecting parts based on a cost factor; selecting parts based on if the parts are high volume, slow moving, lumpy, or the like; etc.), using the stored querying information, where the other factors may be analyzed using various methodologies and/or techniques (e.g., analyzing Pareto information, analyzing trend information, etc.). In some implementations, the parts may be presented to the user of user device 210 for selection.

As further shown in FIG. 5, process 500 may include determining a forecasted failure rate for the new spare parts forecast (block 540). For example, new spare parts server 230 may determine the forecasted failure rate by adjusting the failure rate for the comparable parts based on internal failure rate information for the parts included in the new model product (e.g., determining the forecasted failure rate by increasing the failure rate if the internal failure rate was higher than the failure rate for the comparable parts, determining the forecasted failure rate by decreasing the failure rate if the internal failure rate was lower than the failure rate for the comparable parts, determining the forecasted failure rate to be equal to the failure rate by making no adjustment to the failure rate, etc.).

Additionally or alternatively, new spare parts server 230 may determine the forecasted failure rate by adjusting the failure rate for the comparable parts, included in the old model products, based on improvement information made to the parts included in the new model product over the comparable parts (i.e., determining the forecasted failure rate by decreasing the failure rate if improvements were made to address problems associated with the failure rate for the comparable parts). New spare parts server 230 may read EET data, NCCA data, CARs, and/or other information, provided in the general purpose short-notes application (e.g., QNotes, MS OneNote, a text editor) and/or other applications, to identify and/or extract improvement information for further analysis by using the stored querying information stored in new spare parts server 230, new spare parts memory 240, and/or another device.

As further shown in FIG. 5, process 500 may include generating a new spare parts forecast (block 545). For example, new spare parts server 230 may generate a new spare parts forecast for the parts, included in the new model product, and selected for the new spare parts forecast. New spare parts server 230 may identify an exposed base. The exposed base is a total quantity of the new model products and/or the parts, included in the new model product, selected for the new spare parts forecast, that are in circulation and/or are at risk of failing during the forecast period. The exposed base may be a total quantity of new products and/or parts, included in the new model product, sold and/or projected for sale during the forecast period (e.g., adhesives with the generic code=41110048) that were sold and/or projected for sale during the forecast period (e.g., Jun. 1, 2015-Dec. 1, 2015). New spare parts server 230 may analyze a variety of information (e.g., production information, internal quality information, product information, etc.) to determine the total quantity of the part sold and/or projected for sale (e.g., a total quantity of 500 adhesives are projected for sale between Jun. 1, 2015-Dec. 1, 2015).

Additionally, or alternatively, new spare parts server 230 may multiply the exposed base by the forecasted failure rate for the selected parts (e.g., 500 adhesives*10%) to forecast a quantity of new spare parts to have in inventory (e.g., 50 adhesives with the generic code=41110048 forecasted for new spare parts between Jun. 1, 2015-Dec. 1, 2015), where the forecasted failure rate equals the failure rate for the comparable part. Multiplying the exposed base by the forecasted failure rate is one way of forecasting the quantity of new spare parts, and other ways are possible.

As further shown in FIG. 5, process 500 may include performing an action based on the new spare parts forecast (block 550). For example, new spare parts server 230 may cause the new spare parts forecast to be displayed on a display of user device 210. In some implementations, new spare parts server 230 may provide a notification to a user of user device 210 (e.g., via an email address) with the new spare parts forecast. In some implementations, new spare parts server 230 may cause a quantity of new spare parts to be automatically purchased based on the forecasted new spare parts, as shown in FIG. 6F. In some implementations, new spare parts server 230 may automatically populate a purchase screen on user device 210 and/or another device, allowing the user to interact with an input mechanism (e.g., a submit button) to cause a purchase to be made.

As further shown in FIG. 5, process 500 may include updating the new spare parts forecast (block 555). For example, new spare parts server 230 may update the new spare parts forecast based on actual failure information received from claims made on the parts, included in the new model product, after the new model product has been sold. New spare parts server 230 may adjust the forecasted failure rate based on determining a low hour failure rate for the parts included in the new model product (e.g., increase the forecasted failure rate and/or the new spare parts forecast for the quantity of the new spare parts if the low hour failure rate is higher than the forecasted failure rate, decrease the forecasted failure rate and/or the new spare parts forecast for the quantity of new spare parts if the low hour failure rate is lower than the forecasted failure rate, no adjustment to the forecasted failure rate if the low hour failure rate equals (or approximately equals) the forecasted failure rate, etc.).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. Additionally, or alternatively, unless stated otherwise, each block should be treated as optional.

FIGS. 6A-6G are diagrams of an example implementation 600 relating to example process 500 shown in FIG. 5. In example implementation 600, new spare parts server (e.g., new spare parts server 230) may allow a user to submit an identifier, via a user device (e.g., user device 210) for a new model to generate a new spare parts forecast to determine a type and a quantity of new spare parts that may be needed to minimize repair time and maintain operability of new model products, associated with the new model identifier during a set period of time.

Figure 6A:
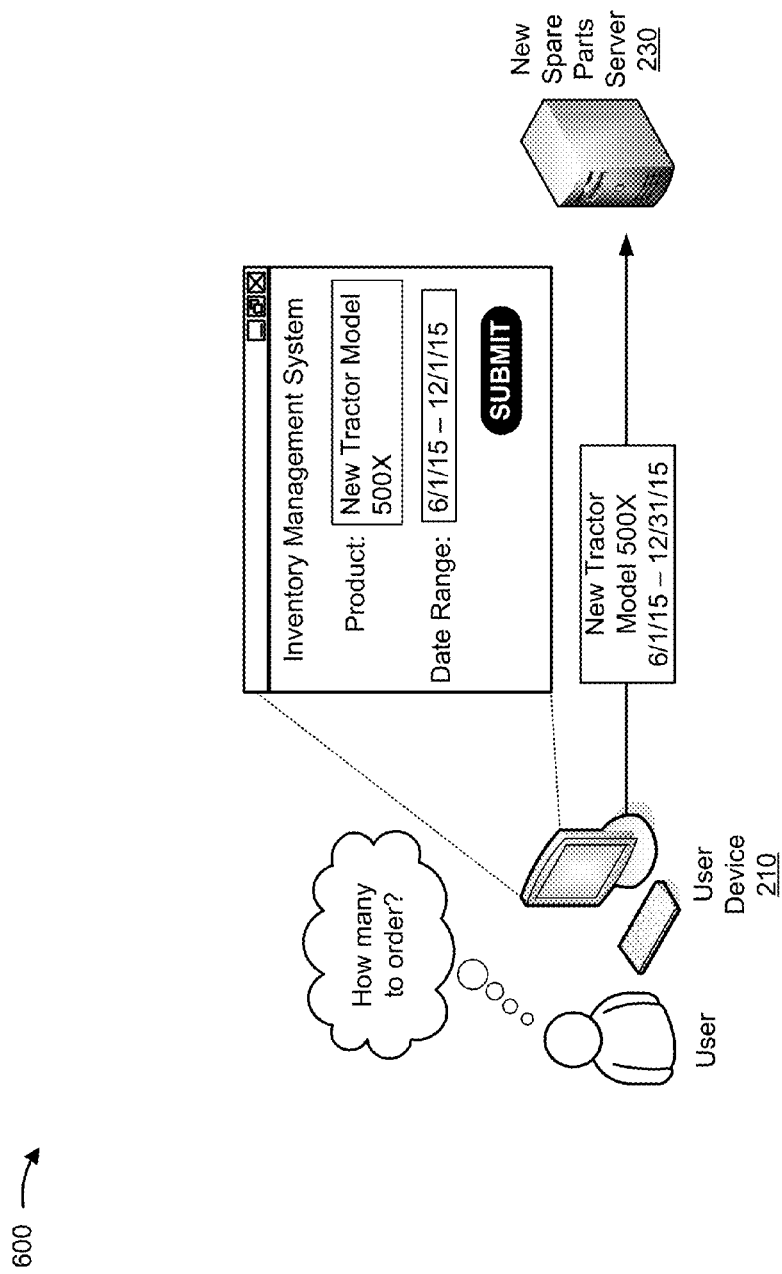
FIGS. 6A-6G are diagrams of an example implementation relating to the example process shown in FIG. 5.

As shown in FIG. 6A, assume that a supply chain manager (e.g., a user of user device 210) desires to know the type and the quantity of new spare parts needed to minimize repair time and maintain operability of a new model product (e.g., New Tractor Model 500X), for a set period (e.g., between Jun. 1, 2015-Dec. 1, 2015 or 6 months after a product launch for the new model product). As shown in FIG. 6A, a user of user device 210 submits an identifier for the new model product (e.g., New Tractor Model 500X) and a forecast period (e.g., Jun. 1, 2015-Dec. 1, 2015), through a client application (e.g., an inventory management system application), using user device 210 to new spare parts server 230.

Figure 6B:
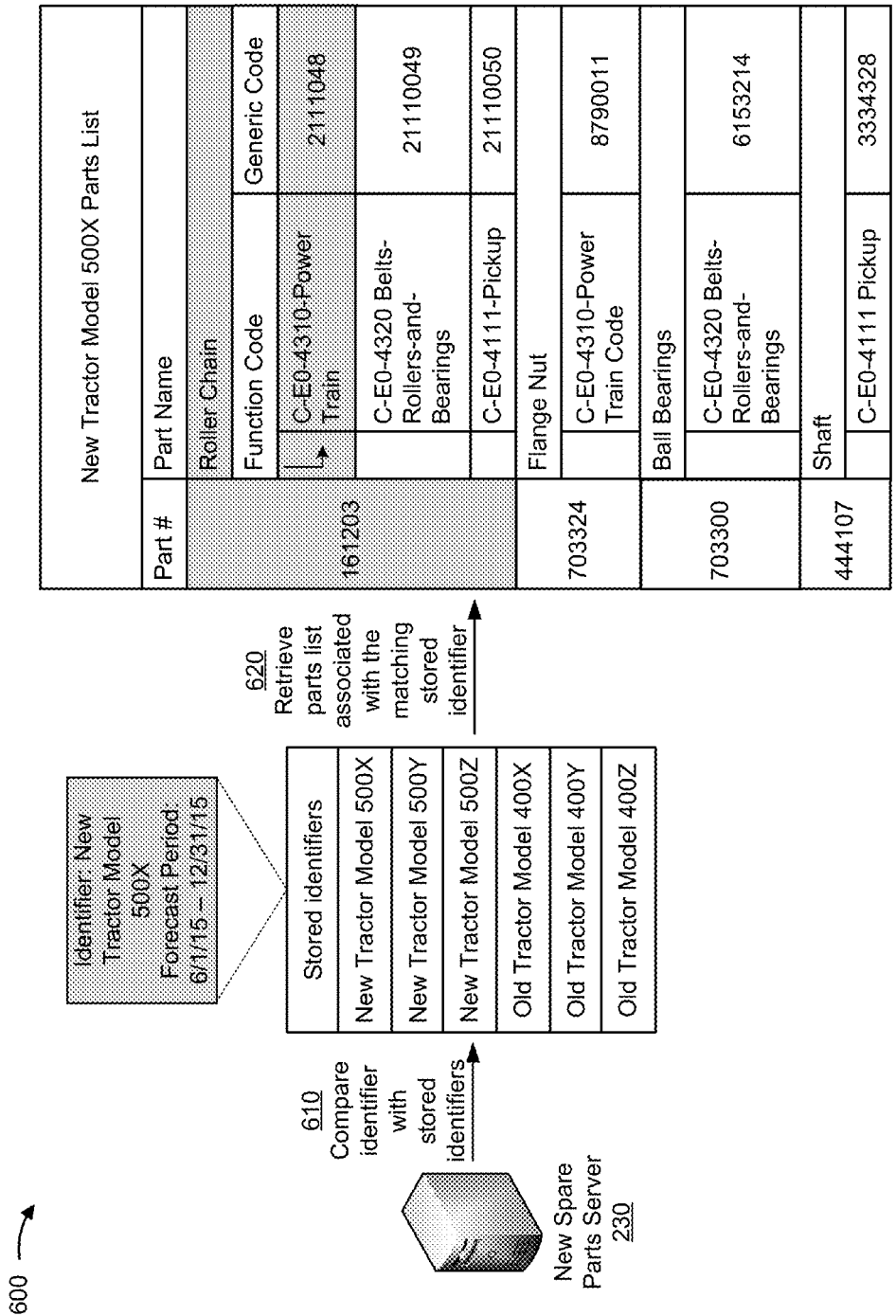

Assume that parts lists for new and/or old model products with associated identifiers have been previously stored by new spare parts server 230. As shown in FIG. 6B, and by reference number 610, new spare parts server 230 may compare the identifier for the new model product with the stored identifiers associated with new model and old products to find a match. As shown in FIG. 6B, and by reference number 620, new spare parts server 230 retrieves a parts list associated with the matching stored identifier (e.g., New Tractor Model 500X). Parts, included on the parts list, have associated function codes (e.g., a roller chain with a part number=161203 and used in a power train system has a function code=C-E0-4310, a roller chain with a part number=161203 and used in a belts, rollers, and bearing system has a function code=C-E0-4320, a roller chain with a part number=161203 and used in a pickup system has a function=C-E0-4111, a flange nut with a part number=703324 and used in a power train system has a function code=C-E0-4320, a ball bearing with a part number=703300 and used in the belts, rollers, and bearing system has the function code=C-E0-4320, a shaft with a part number=444107 and used in the pickup system has a function=C-E0-4111, etc.).

Different parts may share the same function code (e.g., the roller chain and the flange nut are both used in the power train system and share the same function code=C-E0-4310; the roller chain and the ball bearing are both used in the belts, rollers, and bearing system and share the same function code=C-E0-4320; the roller chain and the shaft are both used in the pickup system and share the same function=C-E0-4111, etc.).

The parts also have a determined generic code. Parts, having the same part number but having different function codes, may receive different generic codes (e.g., the roller chain with the part number=161203 and the function code=C-E0-4310 has a generic code=21110048; the roller chain with the part number=161203 and the function code=C-E0-4320 has a generic code=21110049; the roller chain with the part number=161203 and the function code=C-E0-4111 has a generic code=21110050; etc.).

Different parts, having different part numbers but having the same functional code, may also receive different generic codes (e.g., compare the roller chain with the part number=161203 and the function code=C-E0-4310 having a generic code=21110048 with the flange nut with the part number=703324 and the function code=C-E0-4310 having a generic code=8790011; compare the roller chain with the part number=161203 and the function code=C-E0-4320 having a generic code=21110049 with the ball bearing with the part number=703300 and the function code=C-E0-4320 having a generic code=6153214; compare the roller chain with the part number=161203 and the function code=C-E0-4111 having a generic code=21110050 with the shaft with the part number=444107 and the function code=C-E0-4111 having a generic code=3334328, etc.).

Figure 6C:
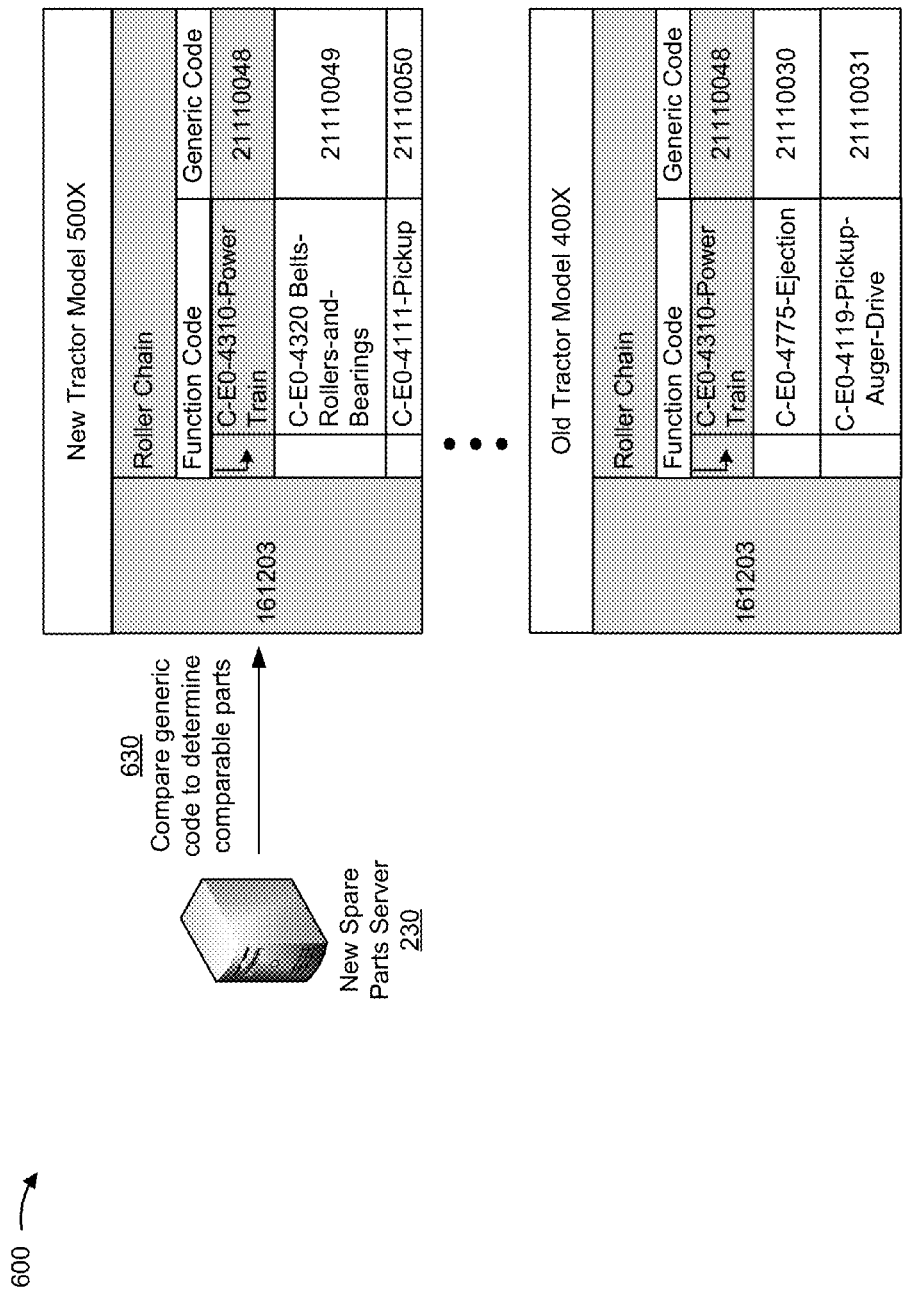

As shown in FIG. 6C, and by reference number 630, new spare parts server 230 compares the generic codes for the parts, included in the new model products, with generic codes previously stored for old model parts. For example, New Tractor Model 500X uses the roller chain in more than one function (i.e., as a component in the power train with the generic code=21110048, as a component in the belts, rollers, and bearings system with the generic code=21110049, and as a component in a pickup auger system with the code=21110050, etc.). Old Tractor Model 400X also uses the roller chain in more than one function (e.g., as a component in a power train system with a generic code=21110048, as a component in an ejection system with the generic code=21110030, a roller chain as a component in a pickup auger system with the code=21110031, etc.). New spare parts server 230 determines the parts to be comparable if the generic codes for the parts, included in the new model products, match the generic codes, previously stored for old model parts (e.g., determining that the roller chain with a generic code=21110048 and used functionally in the power train system for New Tractor Model 500X is comparable to the roller chain with the generic code=21110048 and used functionally in the power train system for Old Tractor Model 400X).

Assume that new spare parts server 230 analyzed warranty information to determine a quantity of claims related to the generic code (e.g., 13 claims related to the generic code=21110048). Assume further that new spare parts server 230 analyzed sales information to determine a total quantity of Old Tractor Model 400X sold (e.g., 379 Old Tractor Model 400Xs sold). Assume further that the comparable part is utilized once in each old model product (e.g., one roller chain with the generic code=21110048 is utilized once in each Old Tractor Model 400X).

Figure 6D:
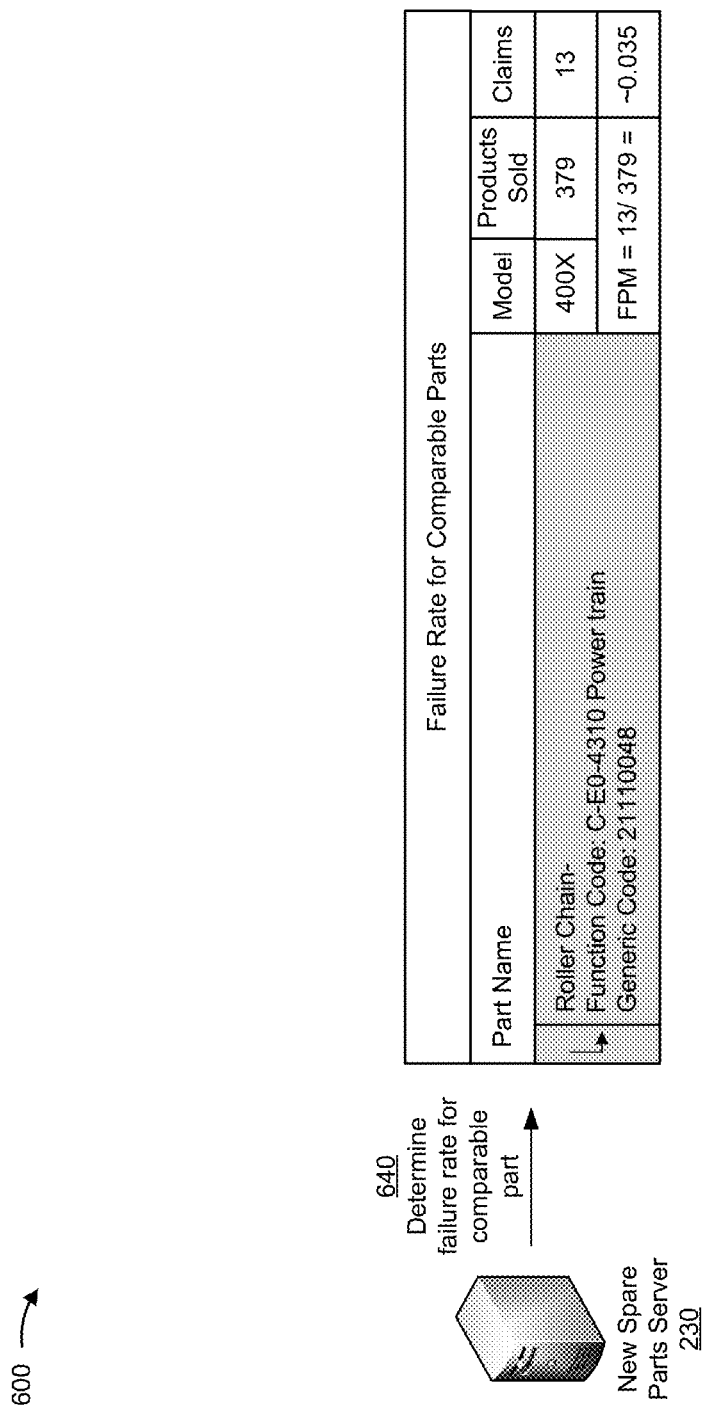

As shown in FIG. 6D, and by reference number 640, new spare parts server 230 determines a failure rate for the comparable part by dividing the quantity of claims related to the generic code by a total quantity of old model product sold (e.g., the failure rate for the roller chain, with the generic code=21110048 in Old Tractor Model 400X, =13 claims/379 Old Tractor Model 400X sold or 3.5%).

Figure 6E:
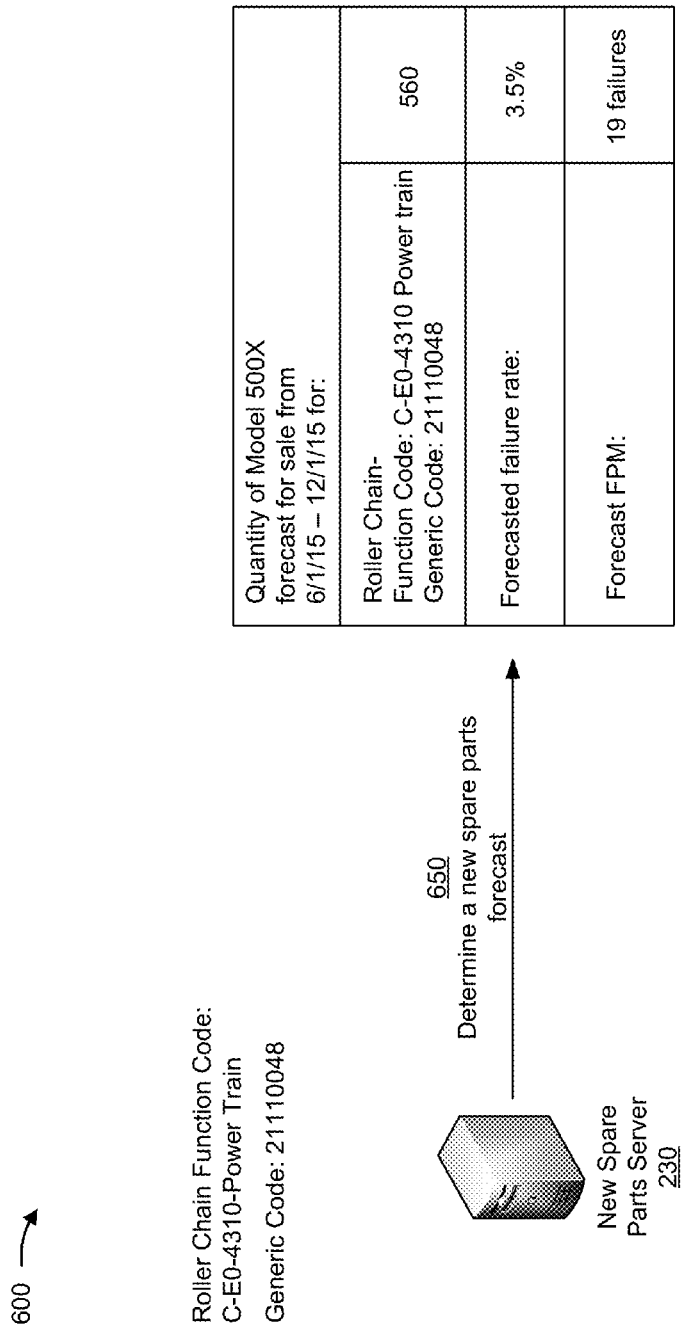
Figure 6F:
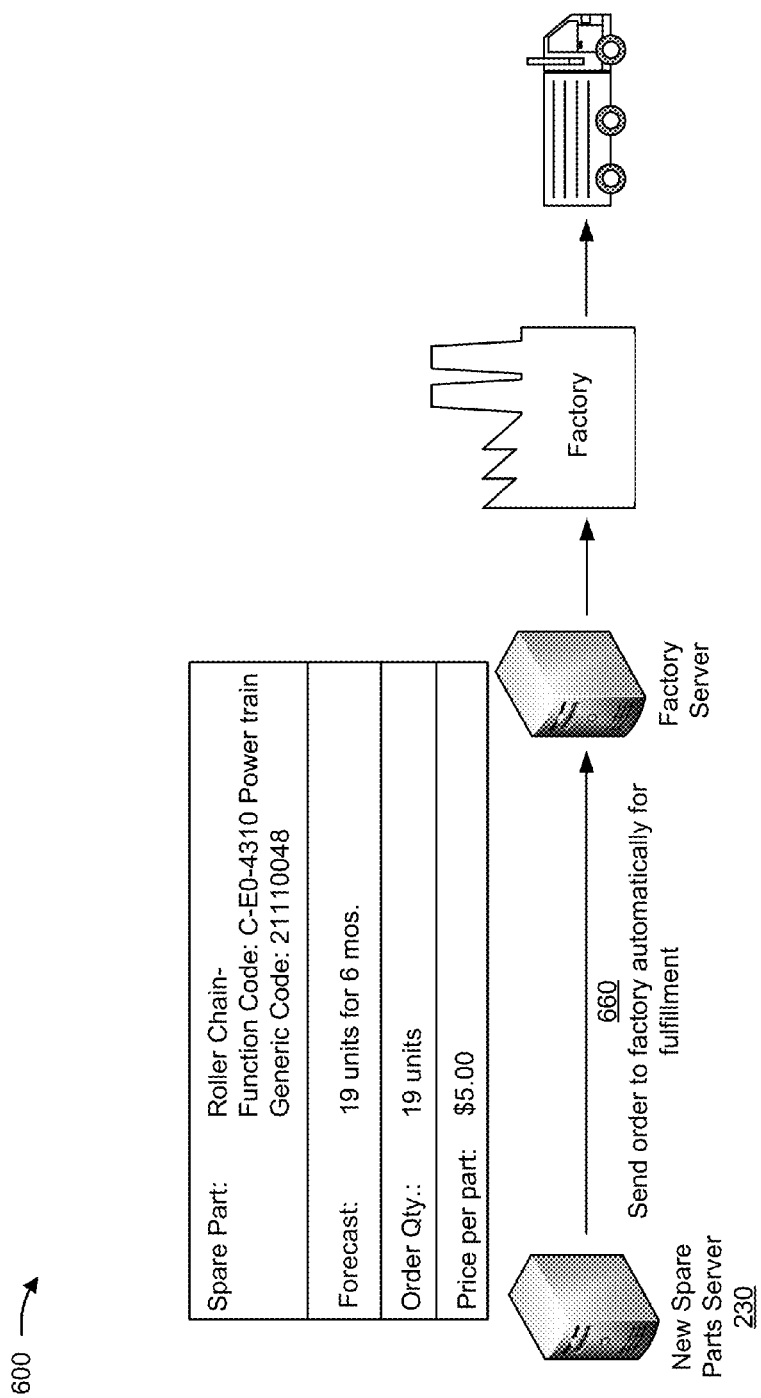

Assume that new spare parts server 230 analyzed product information to determine a total quantity of New Tractor Model 500X projected for sale over the set period of (e.g., 560 New Tractor Model 500Xs projected for sale between Jun. 1, 2015 and Dec. 1, 2015). Assume that no adjustments were made to the failure rate for the comparable parts based on internal quality information to determine a different forecasted failure rate (e.g., the forecasted failure rate=the failure rate=3.5%). As shown in FIG. 6E, and by reference number 650, new spare parts server 230 determines a new spare parts forecast for parts, comparable to the parts included in the old model product, by multiplying a forecasted failure rate for the comparable part, see FIG. 6D, by the total quantity of the new model product projected for sale over the set period of time (e.g., 3.5%×560 New Tractor Model 500Xs (or 560 roller chains with the generic code=21110048)=19 failures forecasted, therefore, 19 new spare roller chains).

As shown in FIG. 6F, and by reference number 660, new spare parts server 230 automatically sends an order to a factory for fulfillment, requesting the quantity of new spare parts as determined by the new spare parts forecast (e.g., order for 19 new spare parts for the roller chains with the generic code=21110048).

Figure 6G:
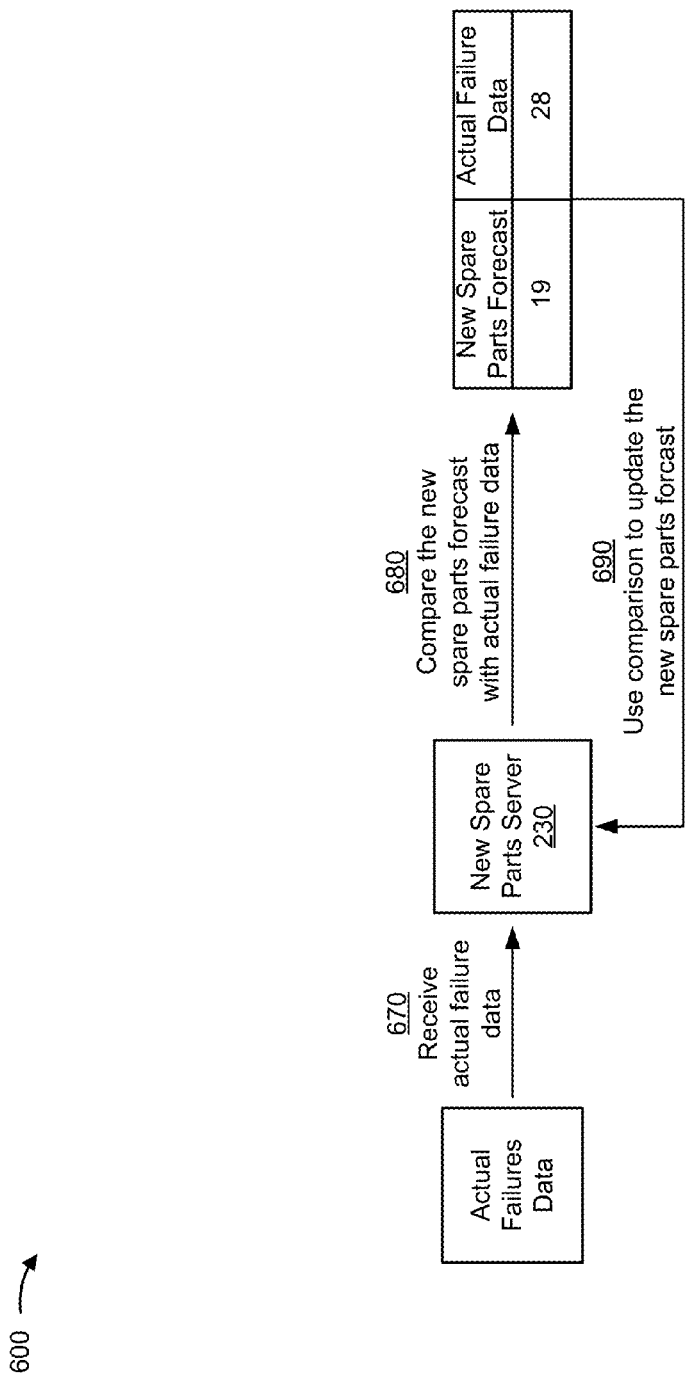

Assume during the six months after the product launch for New Tractor Model 500X, the actual failures for roller chain parts, used in the power train with the generic code=21110048, included in New Tractor Model 500X, is 28. As shown in FIG. 6G, and by reference number 670, new spare parts server 230 may receive actual failure data (e.g., actual failure data, included in updated warranty information) for New Tractor Model 500X. As shown in FIG. 6G, and by reference number 680, new spare parts server 230 may compare the new spare parts forecast with actual failure data (e.g., actual failure data included in updated warranty information) and, as shown by reference number 690, new spare parts server 230 may use the comparison to update the new spare parts forecast (e.g., by adjusting the forecasted failure rate to incorporate actual failure rates) for a new set period of time. In some implementations, new spare parts server 230 may receive feedback of comparison information automatically. In some implementations, new spare parts server 230 may receive feedback of comparison information from a user of user device 210, new spare parts server 230, and/or another device.

As indicated above, FIGS. 6A-6G are provided merely as an example. Other examples are possible and may differ from what was described with regard to FIGS. 6A-6G.

Implementations described herein provide a new spare parts forecasting system that selects parts, included in a new model product, for a new spare parts forecast based on comparable parts included in old model products. Comparable parts may be determined by finding a match between a generic code assigned to parts, included in the new model product, and a generic code, assigned to parts, included in the old model products. Additionally, or alternatively, implementations described herein may use data from integrated sources (e.g., production information, warranty information, internal quality information, product information, and/or other information) for the comparable parts, included in the new model and the old model products, to generate a new spare parts forecast needed to reduce repair time, maintain operability of the new model product, and/or minimize costs. Additionally, or alternatively, implementations described herein may permit the forecasted new spare parts to be automatically purchased.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms.

Further, the phrase "based on" is intended to mean "based, at least in part, on" unless explicitly stated otherwise.

What is claimed is:

1. A system, comprising:
one or more devices to:
receive an identifier for a new model product;
identify a parts list for the new model product associated with the identifier for the new model product;
determine a first code for a part included on the parts list for the new model product;
compare the first code for the part included on the parts list for the new model product with codes for parts included in old model products;
determine that the part included on the parts list for the new model product is comparable to one of the parts included in the old model products when the first code for the part included on the parts list for the new model product matches a second code, of the codes, for the one of the parts included in the old model products;
determine a failure rate for the one of the parts included in the old model products based on a total quantity of the one of the parts, included in the old model products, that have been produced during a particular time period, and based on a quantity of the one of the parts, included in the old model products, that failed during the particular time period;
determine a forecasted failure rate for the part included on the parts list for the new model product based on adjusting the failure rate,
the failure rate being adjusted based on:
failure data associated with the part included on the parts list for the new model product, and
information identifying an improvement of the part, included on the parts list for the new model product, over the one of the parts included in the old model products;
generate a new spare parts forecast for a type and a quantity of new spare parts associated with the part included on the parts list for the new model product based on the forecasted failure rate;
automatically populate, based on generating the new spare parts forecast, a purchase screen on a user device to enable the quantity of new spare parts to be purchased; and
cause the quantity of the new spare parts to be automatically purchased.

2. The system of claim 1, where the one or more devices are further to:
provide the new spare parts forecast for display.

3. The system of claim 1, where the one or more devices are further to:
provide a notification, to the user device, with the new spare parts forecast.

4. The system of claim 1, where the one or more devices are further to:
provide information to automatically purchase the quantity of the new spare parts.

5. The system of claim 1, where the one or more devices are further to:
update the new spare parts forecast based on actual data for the part included on the parts list for the new model product.

6. The system of claim 1, where the one or more devices, when generating the new spare parts forecast, are to:
generate the new spare parts forecast based on one or more of production information, warranty information, internal quality information, or product information associated with the new model product.

7. A computer-readable medium storing instructions, the instructions comprising:
one or more instructions that, when executed by one or more processors, cause the one or more processors to:
receive an identifier for a new model product;
identify a parts list, for the new model product, associated with the identifier for the new model product;
determine a first code for a part included on the parts list for the new model product;
compare the first code with codes for parts included in old model products;
determine that the part included on the parts list for the new model product is comparable to one of the parts included in the old model products when the first code matches a second code for the one of the parts included in the old model products;
determine a failure rate for the one of the parts included in the old model products based on a total quantity of the one of the parts, included in the old model products, that have been produced during a particular time period, and based on a quantity of the one of the parts, included in the old model products, that failed during the particular time period;
determine a forecasted failure rate for the part included on the parts list for the new model product based on adjusting the failure rate,
the failure rate being adjusted based on:
failure data associated with the part included on the parts list for the new model product, and
information identifying an improvement of the part, included on the parts list for the new model product, over the one of the parts included in the old model products;
generate a new spare parts forecast for a type and a quantity of new spare parts associated with the part included on the parts list for the new model product based on the forecasted failure rate;
automatically populate, based on generating the new spare parts forecast, a purchase screen on a user device to enable the quantity of new spare parts to be purchased; and
cause the quantity of the new spare parts to be automatically purchased.

8. The computer-readable medium of claim 7, where the one or more instructions, when executed by the one or more processors, further cause the one or more processors to:
provide a notification, indicating that there are no comparable parts, when the first code does not match a code for the parts included in the old model products.

9. The computer-readable medium of claim 7, where the one or more instructions, when executed by the one or more processors, further cause the one or more processors to:
receive an input selecting the new model product from a list of new model products; and
where the one or more instructions, that cause the one or more processors to receive the identifier for the new model product, cause the one or more processors to:
receive the identifier for the new model product based on receiving the input.

10. The computer-readable medium of claim 7, where the one or more instructions, when executed by the one or more processors, further cause the one or more processors to:
identify one of a part term code, a function code, or a category code for the part included on the parts list for the new model product; and where the one or more instructions, that cause the one or more processors to determine the first code for the part included on the parts list for the new model product, cause the one or more processors to:
determine the first code for the part included on the parts list for the new model product based on the part term code, the function code, or the category code.

11. The computer-readable medium of claim 7, where the one or more instructions, that cause the one or more processors to generate the new spare parts forecast, cause the one or more processors to:
generate the new spare parts forecast based on production information,
the production information including at least one of:
parts list information for the new model product and the old model products,
information identifying functionalities of parts included on the parts lists for the new model product,
materials information relating to parts included on the parts list for the new model product,
manufacturing information relating to the parts included on the parts list for the new model product, or
product hierarchy information relating to parts included on the parts list for the new model product.

12. The computer-readable medium of claim 7, where the one or more instructions, that cause the one or more processors to generate the new spare parts forecast, cause the one or more processors to:
generate the new spare parts forecast based on warranty information,
the warranty information including at least one of:
information identifying a type and a scope for a warranty offered for the new model product and the old model products,
information identifying an effective period for the warranty,
information identifying terms for the warranty, or
claims information relating to at least one of the new model product or the old model products.

13. The computer-readable medium of claim 7, where the one or more instructions, that cause the one or more processors to generate the new spare parts forecast, cause the one or more processors to:
generate the new spare parts forecast based on internal quality information,
the internal quality information including at least one of:
internal factory first pass yield data,
audit data,
engineering and evaluation test data,
non-compliance and correction action data, or
corrective action reports.

14. The computer-readable medium of claim 7, where the one or more instructions, that cause the one or more processors to generate the new spare parts forecast, cause the one or more processors to:
generate the new spare parts forecast based on product information,
the product information including at least one of:
sales forecast data for the new model product,
a quantity of the new model product that is manufactured,
information identifying a sales plan for the new model product, or
sales data for the new model product and the old model products.

15. A method, comprising:
receiving, by a device, an identifier for a new model product;
receiving, by the device, a date range for a new spare parts forecast associated with the new model product;
identifying, by the device, a parts list, for the new model product, associated with the identifier for the new model product;
determining, by the device, a first code for a part included on the parts list for the new model product;
comparing, by the device, the first code with codes for parts included in old model products;
determining, by the device, that the part included on the parts list for the new model product is comparable to one of the parts included in the old model products when the first code matches a second code for the one of the parts included in the old model products;
determining, by the device, a failure rate for the one of the parts included in the old model products based on a total quantity of the one of the parts, included in the old model products, that have been produced during a particular time period, and based on a quantity of the one of the parts, included in the old model products, that failed during the particular time period;
determining, by the device, a forecasted failure rate for the part included on the parts list for the new model product based on adjusting the failure rate,
the failure rate being adjusted based on:
failure data associated with the part included on the parts list for the new model product, and
information identifying an improvement of the part, included on the parts list for the new model product, over the one of the parts included in the old model products;
generating, by the device and for the date range, the new spare parts forecast based on the forecasted failure rate,
the new spare parts forecast being for new spare parts associated with the part included on the parts list for the new model product;
automatically populating, by the device and based on generating the new spare parts forecast, a purchase screen on a user device to enable the new spare parts to be purchased; and
causing, by the device, the new spare parts to be automatically purchased.

16. The method of claim 15, further comprising:
providing the new spare parts forecast for display.

17. The method of claim 16, further comprising:
updating the new spare parts forecast based on actual data for the part included on the parts list for the new model product.

18. The method of claim 16, where generating the new spare parts forecast comprises:
generating the new spare parts forecast based on one or more of production information, warranty information, internal quality information, or product information associated with the new model product.

19. The system of claim 1, where the one or more devices are further to:
analyze warranty information; and
where the one or more devices, when determining the failure rate, are to:
determine the failure rate based on analyzing the warranty information.

20. The method of claim 15, further comprising:
updating the new spare parts forecast based on actual failure information associated with the new spare parts.

* * * * *